Oct. 13, 1942.   P. W. SULLIVAN   2,298,515
WINDOW STRUCTURE
Filed July 14, 1941   2 Sheets-Sheet 1

Perry W. Sullivan
INVENTOR

BY Walter E. Schirmer
ATTORNEY

Oct. 13, 1942.　　　P. W. SULLIVAN　　　2,298,515
WINDOW STRUCTURE
Filed July 14, 1941　　　2 Sheets-Sheet 2
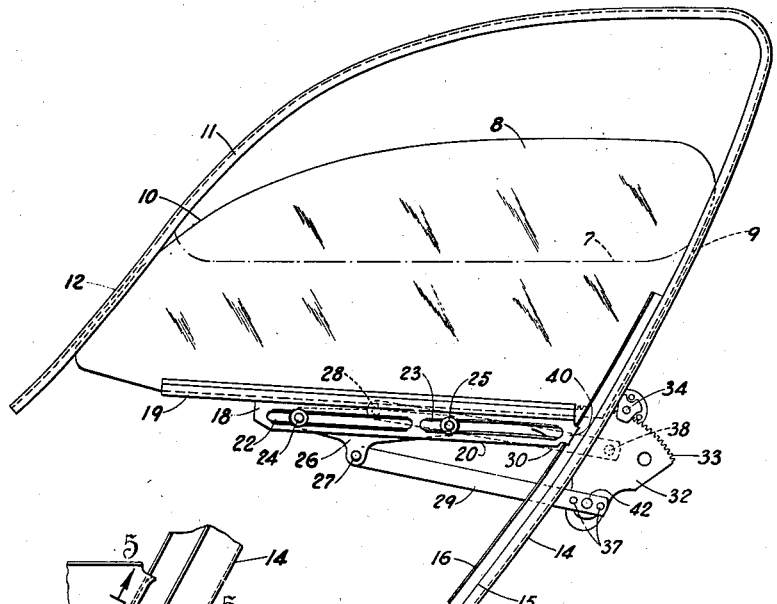
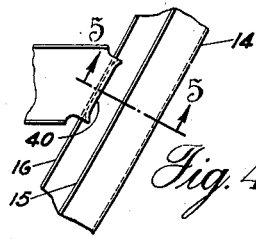
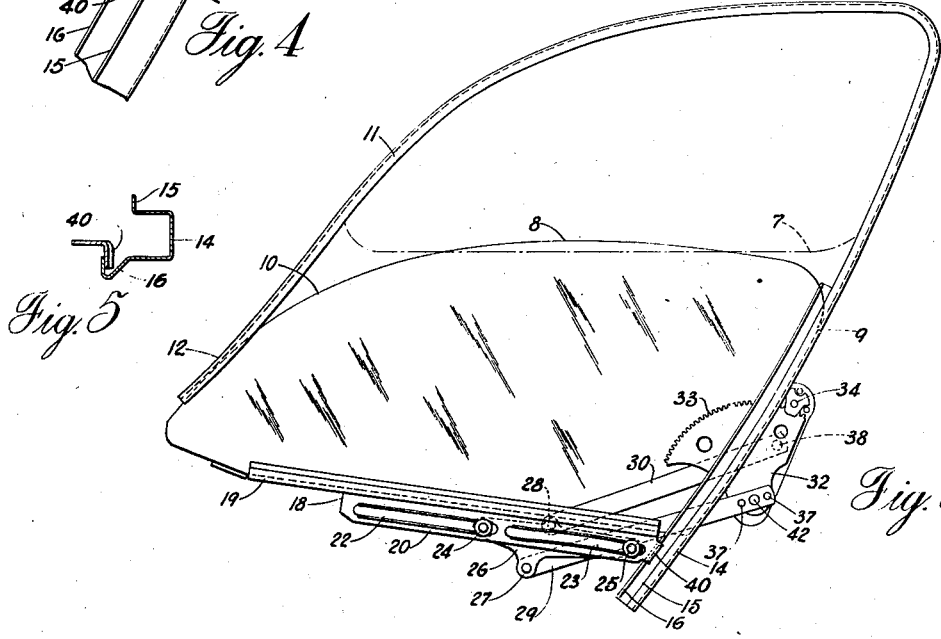
Perry W. Sullivan
INVENTOR
BY Walter E. Schirmer
ATTORNEY Patented Oct. 13, 1942

2,298,515

UNITED STATES PATENT OFFICE 2,298,515

WINDOW STRUCTURE

Perry W. Sullivan, South Bend, Ind., assignor to The Studebaker Corporation, South Bend, Ind., a corporation of Delaware Application July 14, 1941, Serial No. 402,324

1 Claim. (Cl. 296—44)

This invention relates to window structures and more particularly is directed to a window structure for the rear quarter window in automotive vehicles of the passenger car sedan type.

One of the primary objects of the present invention is to provide a rear quarter window construction in which the window can be lowered to a fully open position with the upper edge of the window disposed at the lower edge of the sill or window frame.

Heretofore in the constructions with which I am familiar it has been impossible to lower the rear quarter window to a fully open position. This has been due in large part to the streamlining of the vehicles resulting in lowering the floor of the vehicle and, consequently, causing the wheel housing for the rear wheels to project further upwardly into the body structure, thereby taking away the space available to receive the window below the window opening. Also, in the streamlining of such vehicles the rear deck or tail portions of the top of the vehicle has been sloped rearwardly, thereby causing the upper edge of the rear quarter window to sweep downwardly and rearwardly. Consequently, the vertical extent of the window at its forward edge is much greater than at its rear edge and to accommodate vertical lowering of the window an amount of space was required which was not available in the side panel of the vehicle due to the projecting wheel housing and other necessary elements of body construction.

The present invention obviates these difficulties by providing a construction in which the window runs for guiding the window during opening and closing will sweep downwardly and rearwardly so that the window in moving from closed to open position moves both vertically and also rearwardly.

In conjunction with the guide arrangement the window regulator arms are so arranged that as the window is lowered it is also rotated in a vertical plane so that the forward edge of the window moves downwardly and rearwardly faster than the rear edge, whereby as the window reaches its lowermost position the rearwardly sloping upper edge of the window approaches a horizontal position and consequently lies substantially flush with the sill or lower edge of the window opening.

These and other objects and advantages of the present invention will appear more fully from the following detailed description which, taken in conjunction with the accompanying drawings, will disclose to those skilled in the art the particular construction and operation of a preferred form of the present invention.

In the drawing:

Figure 2 is a corresponding detail view showing the window in half open position;

Figure 3 is a view corresponding to Figure 2 showing the window in substantially fully open position;

Figure 4 is a detail view showing the manner in which the window is held against rattling or misalinement during its opening and closing movements; and Figure 5 is a sectional view taken substantially on line 5—5 of Figure 4.

Figure 1:
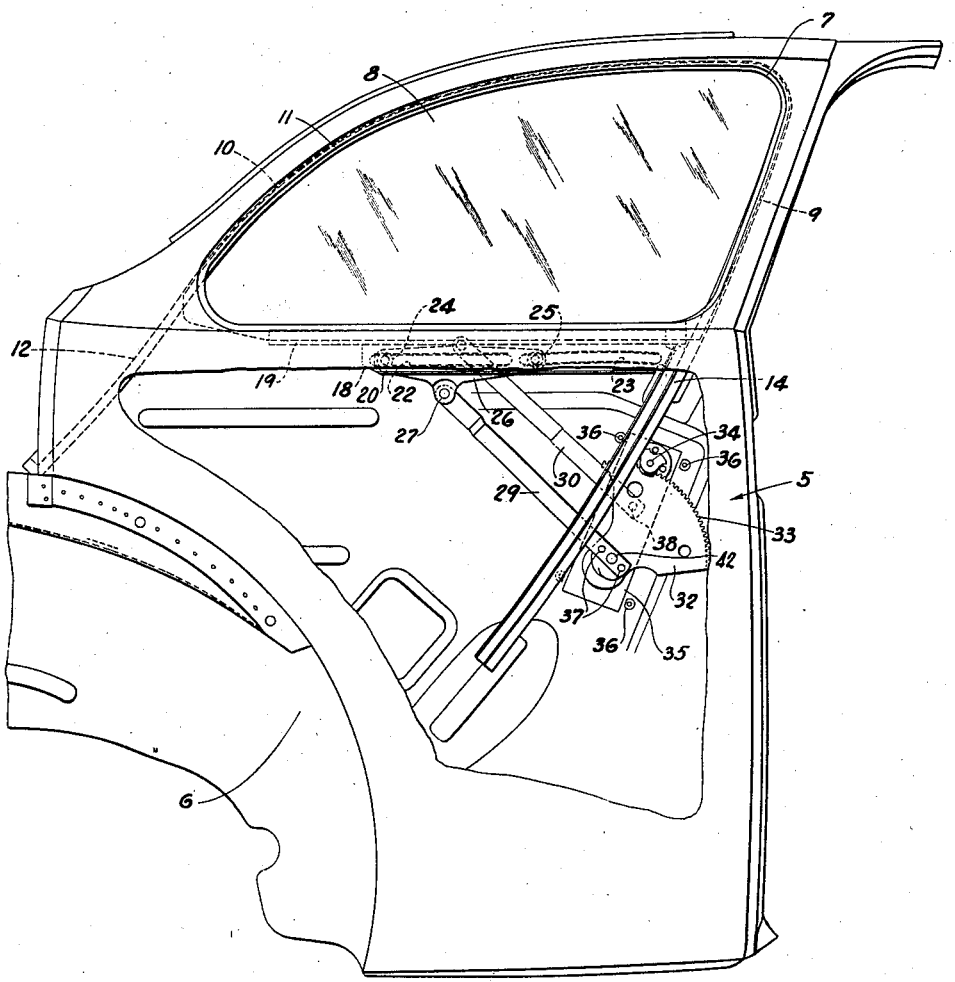
Figure 1 is a vertical elevational view of the side panel and wheel housing at the rear of the vehicle with a portion broken away to show the window operating mechanism and window guides.

Referring now in detail to the drawings, the side panel of the vehicle is indicated generally at 5 and includes an arcuate wheel housing 6 which extends upwardly an appreciable extent into the side wall of the vehicle. A window opening or frame is indicated at 7 and is provided with suitable garnish molding or the like as well as weatherstripping for receiving the window in weathertight relationship, the window being indicated at 8.

It will be apparent from an inspection of Figures 1 to 3 that the window 8 has an upwardly and forwardly inclined front edge 9 and that the top edge of the window slopes rearwardly and downwardly as indicated at 10, whereby the rear portion of the window is of materially less vertical extent than the forward portion.

Extending downwardly from the rear guiding portion of the window frame 7 is a channel shaped guide or runway 12 which extends diagonally rearwardly and downwardly and forms a continuation of the arcuate rear edge portion 11 of the frame 7. Similarly, at the forward end 9 of the window the frame is provided with a continuation generally indicated at 14, this being in the form of a channel portion as shown in Figure 5, having an outstruck edge flange 15 for securing it in position and having an offset channel portion 16 for a purpose to be described hereinafter.

The window is adapted to be disposed in a suitable supporting member 18 into which the lower edge of the window is rigidly set. The member 18, as shown more clearly in Figures 2 and 3, includes a channel portion 19 receiving the lower edge of the window and having a depending flange portion 20 provided with an elongated slot 22 and also having an elongated arcuate slot 23, the ends of the latter being disposed downwardly, and the slots being arranged substantially in spaced longitudinal alinement. The slots 22 and 23 are adapted to receive the offset end rollers 24 and 25 of a bracket member 26, which bracket member has the rollers 24 and 25 pivotally secured to the opposite longitudinal ends thereof. The bracket 26 is provided with vertically spaced ear portions 27 and 28 providing journals for pivotally securing the ends of the window regulator arms 29 and 30 thereto.

The arms 29 and 30 at their opposite ends are secured to the pivotally mounted sector 32 having the arcuate gear or rack portion 33 adapted to be engaged by the pinion gear carried by the shaft 34 to which the window crank is secured. This entire assembly is secured in the side panel below the window frame by means of a carrying plate 35 screwed into a suitable retaining flange by means of the screws 36 and is more or less conventional insofar as the segmental rack and pinion ararngement is concerned.

The sector 32 is pivotally mounted on the plate 35 for rotation in response to the pinion actuated by the window crank. The arm 29 is secured to the sector 32 and is held against rotation by the pins 37 so that it will rotate conjointly with the sector. The arm 30 is rotatably journalled on a pin 38 secured in the plate 35 and rotates about this point independently of the sector 32, being unconnected with respect to the sector. The flange 20 of the window carrying member 18 is provided at its forward end portion with a normally directed diagonally offset flange 40, shown more clearly in Figures 4 and 5. The flange 40 locks into the offset channel 16 of the guide 14 in such manner that as the window is raised and lowered the member 18 is held in fixed sliding relationship to the guide 14, preventing any lateral oscillation of the window with respect to the guide and, consequently, holding the window in proper position against any wedging action or misalinement that might interfere with its sliding movement.

From an inspection of Figures 1 to 3, inclusive, it will be apparent that the member 18, as it moves downwardly by rotation of the sector 33, also rotates in a clockwise direction. This produces a rotative movement of the window due to the fact that it is also being moved bodily downwardly and as a result the forward edge 9 of the window moves faster than the rear portion of the window whereby, when the window is in its lowered position, the upper edge thereof assumes a generally horizontal position. The relation of the regulator arms 29 and 30 with respect to the pivots on the bracket 26 and with respect to the stationary pivots 38 and 42 at the opposite ends of the arms causes the arms to move in such manner that the bracket 26 is rotated and together with the roller 24 riding in the slot 22 and the roller 25 riding in the arcuate slot 23 causes the slot member 18 to rotate in a clockwise direction with the front edge of the window 8 traveling at a faster rate than the rear edge. Thus the window 8 is bodily swung downwardly and rearwardly into the position shown in Figure 3 and at the same time rotates downwardly slightly relative to its rear edge to provide the necessary faster movement of the front edge so that when in lowered position the front edge will have moved downwardly into the position shown in Figure 3 below the window opening 7 so that the upper edge portion of the window is in substantially the same horizontal plane as the lower edge of the window opening.

It is therefore believed apparent I have provided a novel type of window construction which allows full opening of the rear quarter window in vehicles in which straight vertical movement of the window would not allow such opening. This is produced by rearward translational movement of the window in conjunction with its lowering, and, also its rotation in a clockwise direction resulting from the relationship of the regulator and the bracket which carry the window supporting member.

I am aware that various changes may be made in certain details of the present construction and I therefore do not intend to be limited except as defined by the scope and spirit of the appended claim.

I claim:

In combination, a window regulator mechanism comprising a supporting member for supporting the lower edge of a window, said supporting member having elongated substantially longitudinally alined slots at least one of which is of arcuate configuration with the ends thereof disposed downwardly, a bracket having longitudinally spaced rollers adapted to ride in said slots, a sector member pivotally mounted for rotation about a fixed axis, a pair of regulator arms each being pivotally mounted at one end to said bracket, the opposite end of one of said arms being pivotally mounted about a fixed axis and the opposite end of the other of said arms being secured to said sector, and a guide member for guiding the window in an arcuate path, means for slidably securing said guide member and said supporting member together, said regulator mechanism and said guide member being arranged so that upon rotation of said sector said supporting member is caused to rotate with one side edge of said window traveling at a faster rate than the other side edge thereof.

PERRY W. SULLIVAN.